(12) United States Patent
Mochizuki

(10) Patent No.: US 9,731,601 B2
(45) Date of Patent: Aug. 15, 2017

(54) ASSEMBLY STRUCTURE FOR ASSEMBLY MEMBER

(71) Applicant: Yazaki Corporation, Minato-ku, Tokyo (JP)

(72) Inventor: Yasufumi Mochizuki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 275 days.

(21) Appl. No.: 14/319,206

(22) Filed: Jun. 30, 2014

(65) Prior Publication Data

US 2015/0010349 A1 Jan. 8, 2015

(30) Foreign Application Priority Data

Jul. 2, 2013 (JP) .................................. 2013-139099

(51) Int. Cl.
*F16B 21/08* (2006.01)
*B60K 37/02* (2006.01)
*F16B 5/06* (2006.01)

(52) U.S. Cl.
CPC ............ *B60K 37/02* (2013.01); *F16B 5/0664* (2013.01); *F16B 21/088* (2013.01); *Y10T 403/70* (2015.01)

(58) Field of Classification Search
CPC ...... B60K 37/02; F16B 5/0664; F16B 21/088; F16B 5/0642; F16B 5/065; F16B 5/0657; Y10T 403/70; Y10T 24/45215; Y10T 24/45241; B60R 13/02; B60R 13/0206; B60R 13/0256
USPC .......................................... 403/326; 296/1.08
See application file for complete search history.

(56) References Cited

U.S. PATENT DOCUMENTS

| | | | | | |
|---|---|---|---|---|---|
| 2,346,495 | A | * | 4/1944 | Lingel .................... | G01R 11/04 220/664 |
| 5,830,002 | A | * | 11/1998 | Ito ....................... | H01R 13/6272 439/358 |
| 6,053,043 | A | * | 4/2000 | Dannenberg ........... | B60K 35/00 73/431 |
| 6,295,701 | B1 | * | 10/2001 | Bessho ................ | H05K 5/0013 24/297 |

(Continued)

FOREIGN PATENT DOCUMENTS

JP        63142725 U    9/1988
JP        09236457 A    9/1997

(Continued)

*Primary Examiner* — Joshua J Michener
*Assistant Examiner* — Keith Minter
(74) *Attorney, Agent, or Firm* — Sughrue Mion, PLLC

(57) ABSTRACT

An assembly structure for an assembly member includes a locking protrusion disposed in a protruding manner on a speedometer ring portion of a decorative ring and a locking portion formed in a meter case and configured to lock the locking protrusion. The locking protrusion includes a substantially quadrangular prismatic portion, which is disposed in a hanging manner from the speedometer ring portion, and a locking depression, which is formed by means of notching across two adjacent lateral faces of the substantially quadrangular prismatic portion. The locking portion includes a locking wall, which extends inward from an opening edge of a locking hole that is formed in the meter case, and a locking protruding part, which is disposed in a protruding manner on the locking wall and which engages with the locking depression.

3 Claims, 8 Drawing Sheets

(56) References Cited

U.S. PATENT DOCUMENTS

| | | | | |
|---|---|---|---|---|
| 6,314,810 B1* | 11/2001 | Kerchaert | | B60K 37/02 73/431 |
| 6,364,618 B1* | 4/2002 | Moreno | | F04D 29/703 403/13 |
| 6,438,808 B1* | 8/2002 | Kung | | A45F 5/02 24/3.11 |
| 6,676,433 B1* | 1/2004 | Ozaki | | H01R 13/5025 439/350 |
| 6,854,919 B2* | 2/2005 | Neumann | | B25G 1/04 15/145 |
| 7,360,964 B2* | 4/2008 | Tsuya | | B60R 13/0206 24/292 |
| 7,753,613 B2* | 7/2010 | Tsuji | | H01R 13/6272 403/326 |
| 7,854,457 B2* | 12/2010 | Tanner | | B60K 20/02 180/336 |
| 7,862,098 B2* | 1/2011 | Biggs | | B60K 37/06 296/37.8 |
| 8,414,048 B1* | 4/2013 | Kwolek | | B60R 13/0262 296/1.08 |
| 8,474,214 B2* | 7/2013 | Dawe | | F16B 5/0664 24/289 |
| 9,126,543 B1* | 9/2015 | Buza | | B60R 13/0206 |
| 9,318,836 B2* | 4/2016 | Yagi | | H01R 13/502 |
| 2003/0045153 A1* | 3/2003 | Yamawaki | | H01R 13/6272 439/352 |
| 2004/0052579 A1* | 3/2004 | Draggoo | | B60R 13/0206 403/326 |
| 2005/0116485 A1* | 6/2005 | Kuroda | | B60R 13/0206 296/1.08 |
| 2007/0228762 A1* | 10/2007 | Vander Sluis | | B60K 37/00 296/70 |
| 2007/0248795 A1* | 10/2007 | Hansen | | B42D 15/0073 428/187 |
| 2010/0264698 A1* | 10/2010 | Stachura | | B29C 44/1238 296/191 |
| 2011/0017742 A1* | 1/2011 | Sausen | | B65D 11/188 220/324 |
| 2012/0153656 A1* | 6/2012 | Casey | | B60R 37/00 296/1.08 |
| 2012/0187812 A1* | 7/2012 | Gerst | | E05C 19/06 312/237 |
| 2012/0291240 A1* | 11/2012 | Suzuki | | B60R 13/0206 24/633 |
| 2013/0322960 A1* | 12/2013 | Zhao | | H05K 5/0221 403/326 |
| 2014/0346799 A1* | 11/2014 | Balla | | B60R 13/0206 296/1.08 |
| 2015/0076852 A1* | 3/2015 | Yamamoto | | B60R 13/02 296/1.08 |

FOREIGN PATENT DOCUMENTS

| | | |
|---|---|---|
| JP | 2005181270 A | 7/2005 |
| JP | 201078157 A | 4/2010 |

* cited by examiner

FIG.4A
FIG.4B
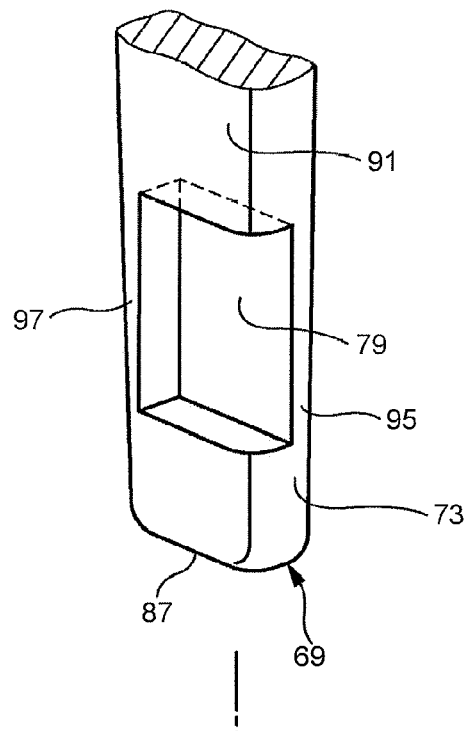
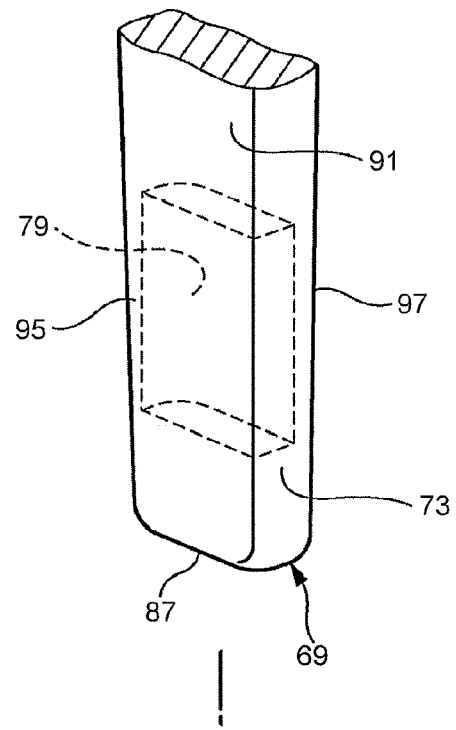
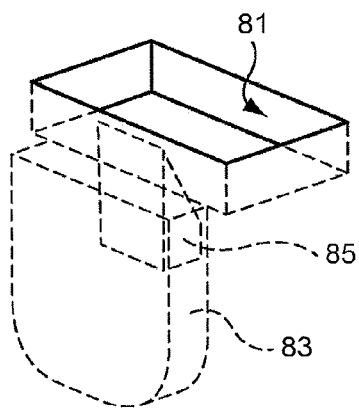
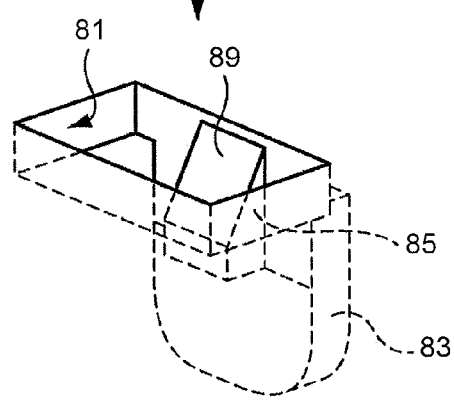

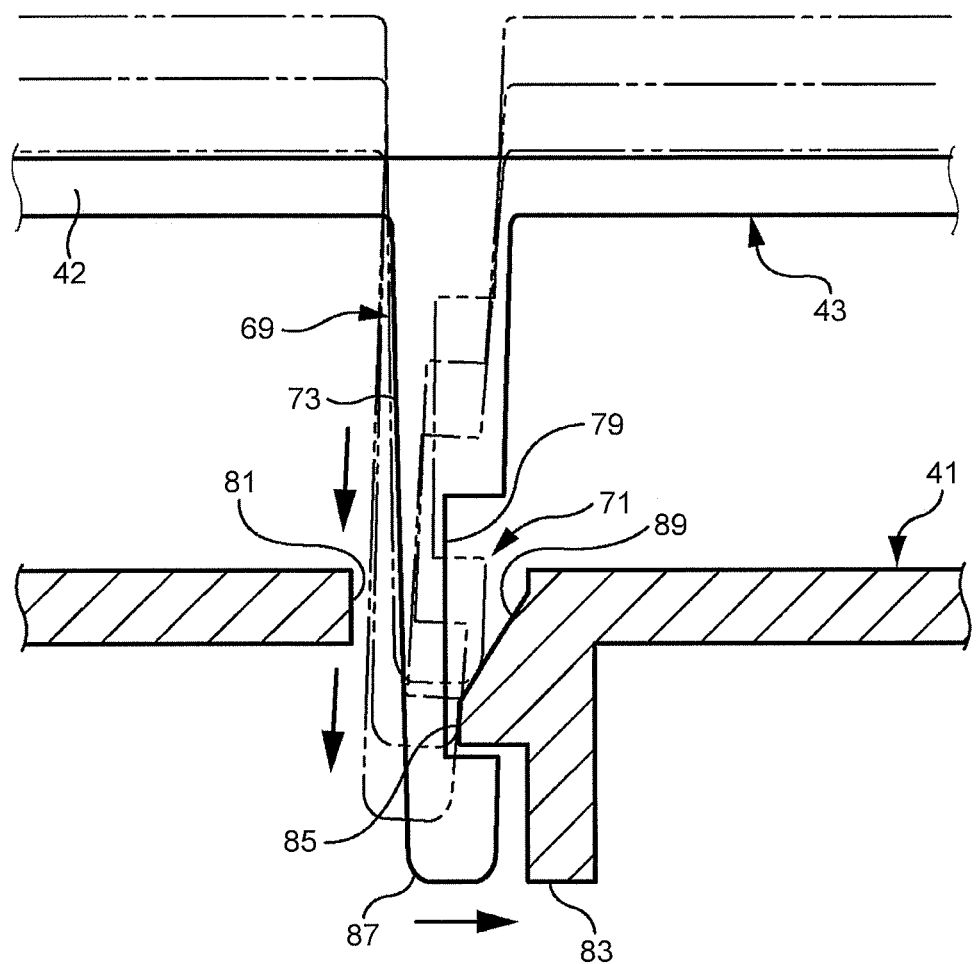

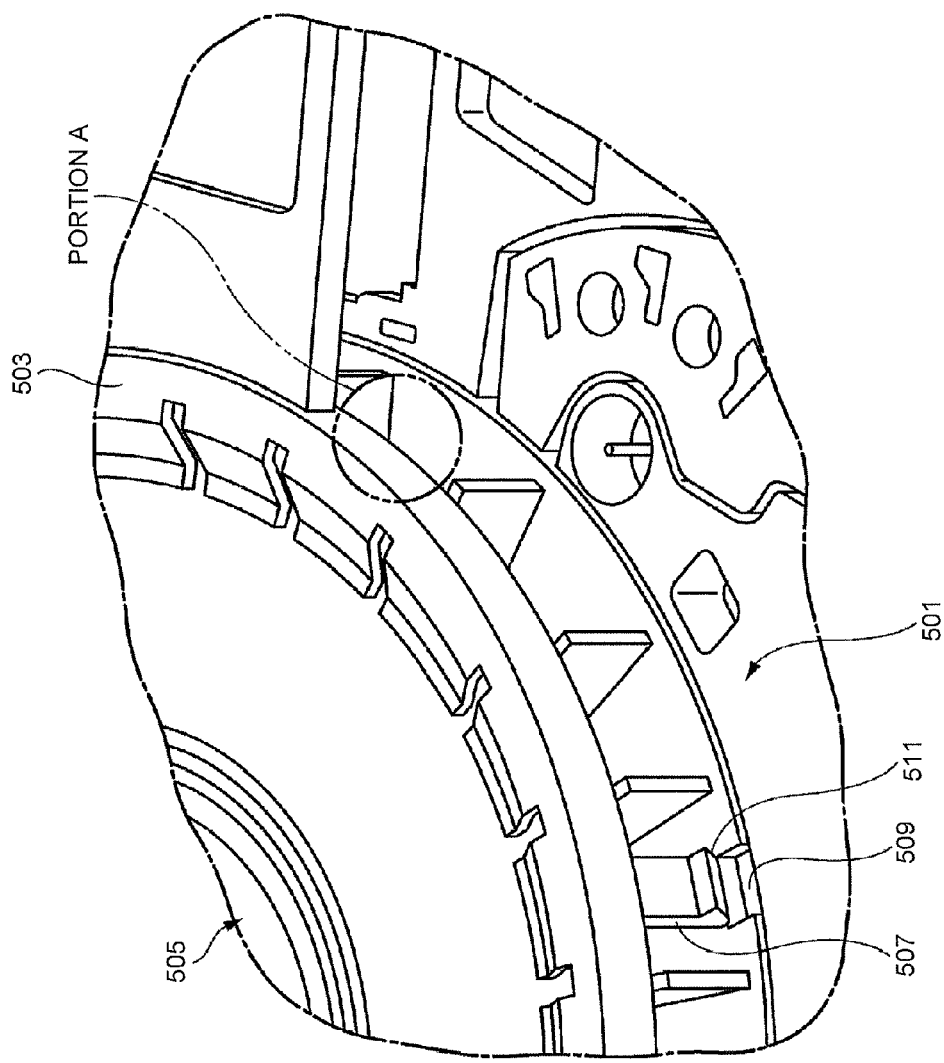

ASSEMBLY STRUCTURE FOR ASSEMBLY MEMBER

CROSS-REFERENCE TO RELATED APPLICATIONS

The present application claims priority to and incorporates by reference the entire contents of Japanese Patent Application No. 2013-139099 filed in Japan on Jul. 2, 2013.

BACKGROUND OF THE PRESENT INVENTION

1. Field of the Present Invention

The present invention relates to an assembly structure for assembling an assembly member, such as a decorative ring, to a target member to be assembled, such as a meter case.

2. Description of the Related Art

Conventionally, around a meter panel for automobile, a decorative ring is disposed with the aim of making the meter panel for automobile attractive. In such a meter panel for automobile, at the time of attaching and fixing the decorative ring to a meter case, typically a locking structure is used that includes a locking claw and a locking hole (for example, see Japanese Utility Model Application Laid-open No. 63-142725, Japanese Patent Application Laid-open No. 9-236457, and Japanese Patent Application Laid-open No. 2005-181270).

In a meter panel for automobile illustrated in FIG. 8, a meter case 501 has a dial (not illustrated) disposed thereon. On the front side of the dial is disposed a decorative ring 503. Thus, the dial is sandwiched between the decorative ring 503 and the meter case 501. The decorative ring 503 is attached to, for example, the outer periphery of a speedometer 505. Moreover, on the front side of the decorative ring 503 is further attached a front glass that is fit to the meter case 501. Furthermore, on the outer periphery of the decorative ring 503, a plurality of locking claws 507 is arranged in a protruding manner at predetermined intervals. The locking claws 507 get locked in locking holes 509 that are formed on the meter case 501. As a result, the decorative ring 503 gets assembled (fixed) to the meter case 501.

Regarding each locking claw 507 present in the locking structure described above, it is necessary to provide a predetermined thickness and width so as to ensure the locking force of a claw head 511 that constitutes a locking portion (a locking face) which abuts against the opening edge of the corresponding locking hole 509. However, at boundary portions (for example, see a portion A in FIG. 8) between various functions of the meter case 501, it is not possible to provide the locking claws 507 and the locking holes 509 in the necessary size due to limitations of space. As a result, it is not possible to provide the locking structure at the required locations of the decorative ring 503. In case the locking structure is not provided at the required locations of the decorative ring 503, it may lead to floating or backlash of the decorative ring 503 at those portions and may result in a strange noise. On the other hand, if spaces are created in the meter case 501 and if the locking structure is disposed in those spaces, then the impact on the design section of the meter panel for automobile is not small.

In view of the above-mentioned circumstances, it is an object of the present invention to provide an assembly structure for an assembly member in which it is possible to provide a locking structure smoothly insertable within a small space and to prevent an occurrence of floating of the assembly member and an occurrence of a strange noise.

SUMMARY OF THE INVENTION

It is an object of the present invention to at least partially solve the problems in the conventional technology.

According to one aspect of the present invention, an assembly structure for an assembly member, includes a locking protrusion disposed in a protruding manner on the assembly member; and a locking portion formed in a target member to be assembled and configured to lock the locking protrusion, wherein the locking protrusion includes a substantially quadrangular prismatic portion, which is disposed in a hanging manner from the assembly member, and a locking depression, which is formed by performing notching across two adjacent lateral faces of the substantially quadrangular prismatic portion, and the locking portion includes a locking wall, which extends inward from an opening edge of a locking hole that is formed in the target member to be assembled, and a locking protruding part, which is disposed in a protruding manner on the locking wall and which engages with the locking depression.

According to another aspect of the present invention, the substantially quadrangular prismatic portion includes a round chamfering at the leading end thereof, and the locking protruding part includes a tapered surface which makes a sliding contact with the leading end of the substantially quadrangular prismatic portion.

According to still another aspect of the present invention, the assembly member is a decorative ring disposed on the front side of a dial, and the target member to be assembled is a meter case.

According to still another aspect of the present invention, one of the two lateral faces in which the locking depression is formed by performing notching serves as a lateral face of the substantially quadrangular prismatic portion that is positioned outward in the radial direction of the decorative ring.

Given above is the brief explanation of the present invention. In addition, by reading through the following explanation of an illustrative embodiment (hereinafter, referred to as "embodiment") of the invention with reference to the accompanying drawings, the details of the present invention would become clearer.

BRIEF DESCRIPTION OF THE DRAWINGS

FIG. 4A is an enlarged perspective view of the relevant part of the substantially quadrangular prismatic portion and the locking portion illustrated in FIG. 2, and FIG. 4B is an enlarged perspective view of the relevant part when the substantially quadrangular prismatic portion and the locking portion illustrated in FIG. 4A are viewed from the backside of a locking depression;

FIG. 5 is a cross-sectional view of the relevant part for explaining the action of the substantially quadrangular prismatic portion inserted in the locking portion;

FIG. 8 is an enlarged perspective view of the relevant part of a meter panel for automobile including a conventional locking structure.

DETAILED DESCRIPTION OF THE PREFERRED EMBODIMENTS

An exemplary embodiment of the present invention is described below with reference to the accompanying drawings.

Figure 1:
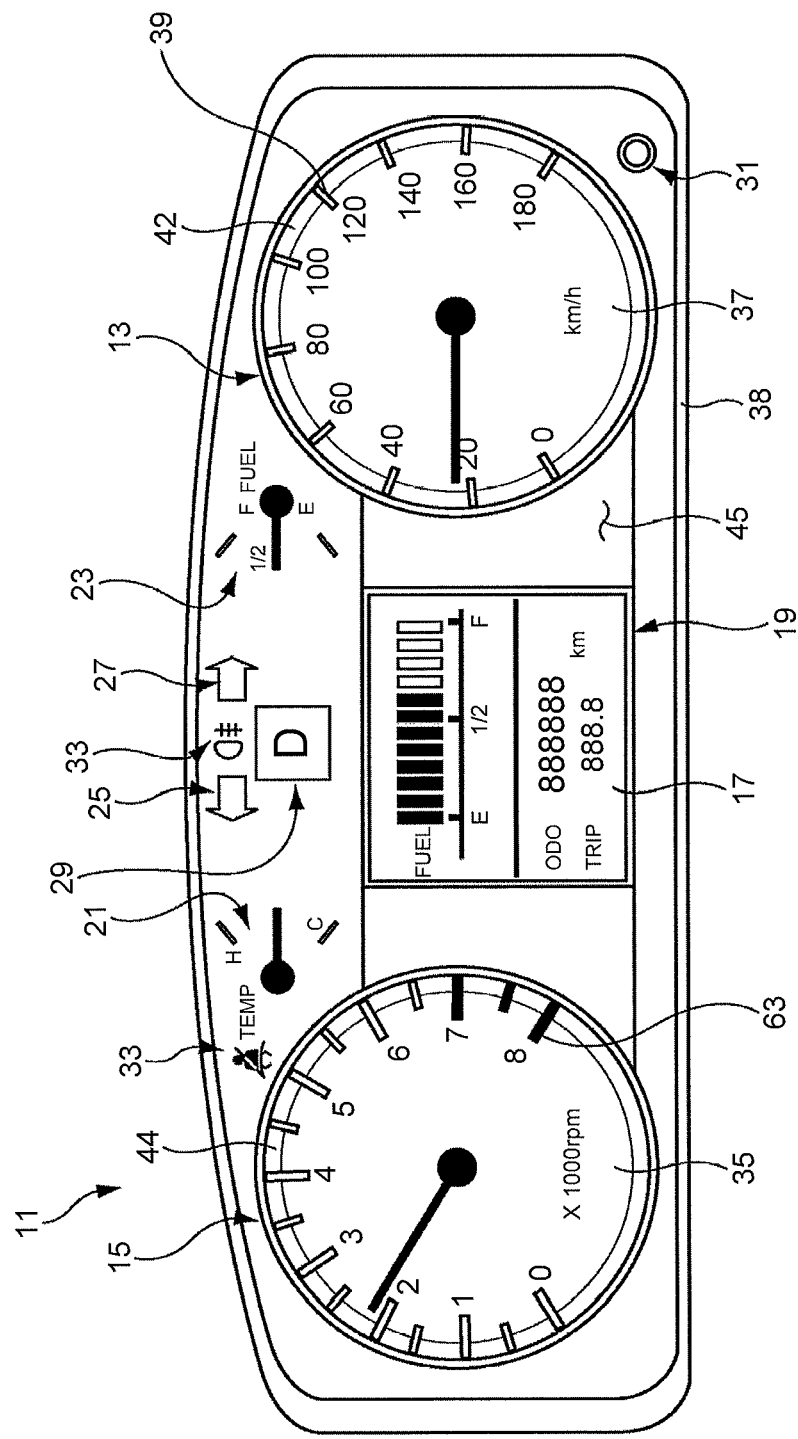
FIG. 1 is a front view of a meter panel for automobile that includes an assembly structure for assembling an assembly member according to an embodiment of the present invention.

As illustrated in FIG. 1, an assembly structure for assembling an assembly member according to the embodiment of the present invention can be suitably used in a meter panel 11 for automobile. Herein, the meter panel 11 for automobile is attached to, for example, an installment panel (not illustrated) of a vehicle. As illustrated in FIG. 1, the meter panel 11 for automobile is equipped with a speedometer 13 that indicates the speed of the vehicle; a tachometer 15 that displays the number of revolutions of the engine; a multiple display unit 19 such as a liquid crystal display (LCD) device using a liquid crystal board 17; a water temperature meter 21 that displays the temperature of the engine cooling water; a fuel level indicator 23; a left turn display unit 25; a right turn display unit 27; a shift indicator 29; a TRIP knob 31; and a warning lamp 33 used to indicate that the seatbelt is not fastened or to indicate that the headlamps are not turned OFF. On some portion of the circumferential edge of a tachometer dial 35, a three-dimensional scale 63 is disposed. Similarly, on some portion of the circumferential edge of a speedometer dial 37, a three-dimensional scale 39 is disposed. The three-dimensional scales 63 and 39 are connected to a light guide plate.

The inner devices such as the speedometer 13, the tachometer 15, the multiple display unit 19, the water temperature meter 21, the left turn display unit 25, the right turn display unit 27, the shift indicator 29, and a pointer movement of the TRIP knob 31 are housed in a meter case 41 (see FIG. 2) that is made of a synthetic resin material and that serves as a target member to be assembled.

Moreover, in the embodiment, on the outer periphery of the speedometer 13 and the tachometer 15 are respectively disposed a speedometer ring portion 42 and a tachometer ring portion 44 of a decorative ring 43 that serves as an assembly member. Thus, in the embodiment, the assembly member points to the decorative ring 43 that is disposed on the front side of the dial, while the target member to be assembled points to the meter case 41. On the front face of the meter case 41 is attached a flap 38 (see FIG. 1) that hides a circuit board of the inner devices housed in the meter case 41 and hides a driving unit. Moreover, on the front face side of the meter case 41 is attached a front glass 45.

Figure 2:
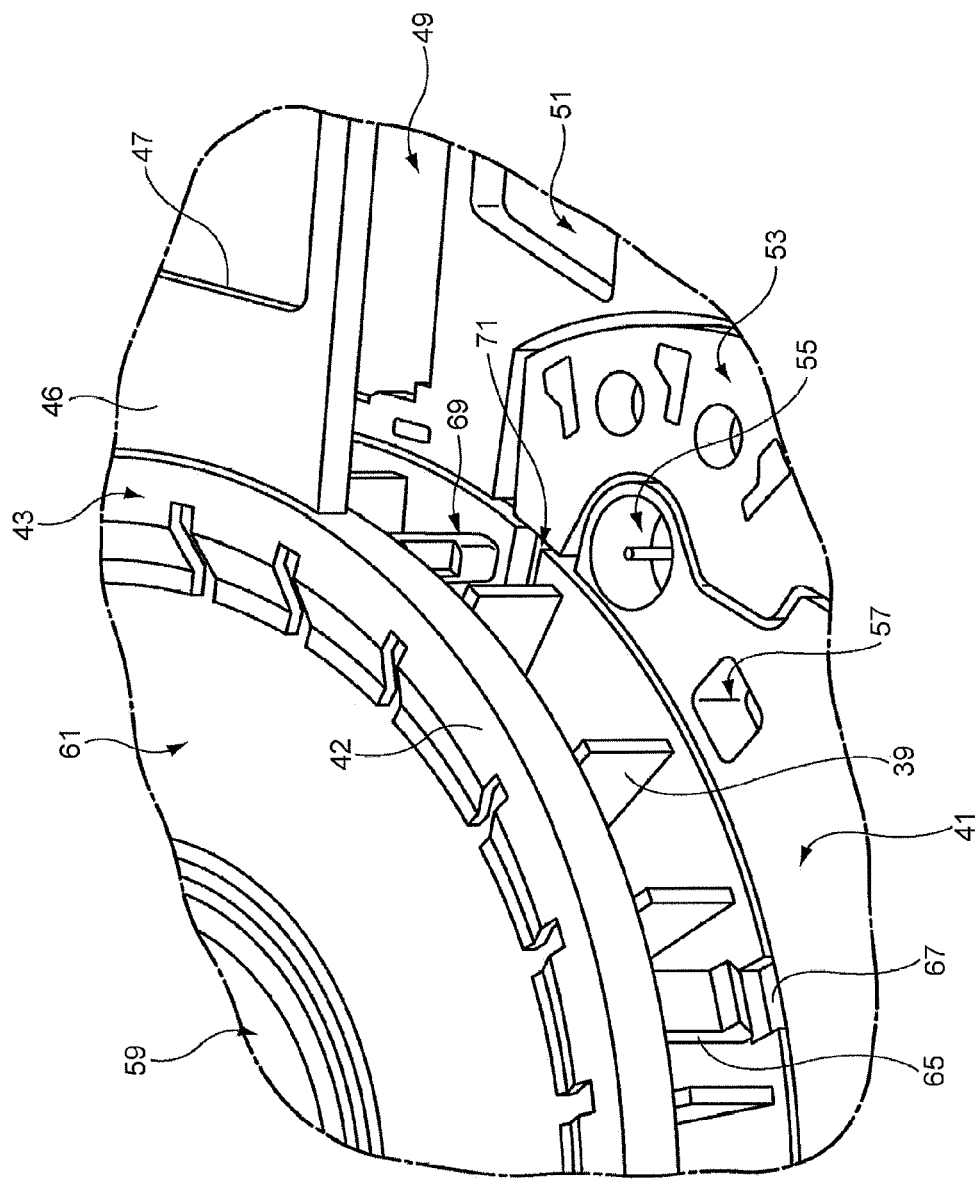
FIG. 2 is an enlarged perspective view of the relevant part of the meter panel for automobile illustrated in FIG. 1.

As illustrated in FIG. 2, in the decorative ring 43, a coupling unit 46 is used in coupling the speedometer ring portion 42 and the tachometer ring portion 44, and has a rectangle hole 47 formed thereon for fitting the multiple display unit 19. On the backside of the rectangle hole 47 is disposed a multiple-display-unit LCD housing unit 49. Besides, in the meter case 41 are disposed a shift-indicator LCD housing unit 51, a fuel-level-indicator light guide plate 53, a fuel-level-indicator pointer configuring unit 55, and a warning lamp hole 57. Moreover, in the meter case 41 are disposed a speedometer light guide plate 61, which includes the three-dimensional scale 39 illustrated in FIG. 2, and a speedometer pointer configuring unit 59; and are disposed a tachometer light guide plate (not illustrated), which includes the three-dimensional scale 63 illustrated in FIG. 2, and a tachometer pointer configuring unit (not illustrated).

Of the meter panel 11 for automobile according to the embodiment, in the speedometer ring portion 42 of the decorative ring 43 and in the meter case 41, a locking structure is disposed, which includes a locking claw 65 and a claw locking hole 67, on the reverse side of the fuel-level-indicator pointer configuring unit 55 across the warning lamp hole 57. When the locking claw 65 gets locked in the claw locking hole 67, the speedometer ring portion 42 of the decorative ring 43 gets assembled (fixed) to the meter case 41.

Moreover, in the meter panel 11 for automobile according to the embodiment, in addition to the known locking structure including the locking claw 65 and the claw locking hole 67, an assembly structure according to the embodiment is disposed for the purpose of assembling the decorative ring 43 to the meter case 41. This assembly structure is installed in the vicinity of the fuel-level-indicator pointer configuring unit 55 and the fuel-level-indicator light guide plate 53 (as well as in the vicinity of a water-temperature-meter pointer configuring unit (not illustrated) and a water-temperature-meter light guide plate (not illustrated)), which was a difficult installation task in the conventional locking structure.

Meanwhile, regarding the assembly structure for assembling the decorative ring 43 to the meter case 41 according to the embodiment, the following explanation is given for an example of an assembly structure for assembling the speedometer ring portion 42 of the decorative ring 43. Moreover, an assembly structure (not illustrated) for assembling the tachometer ring portion 44 of the decorative ring 43 is also substantially identical.

Figure 3A:
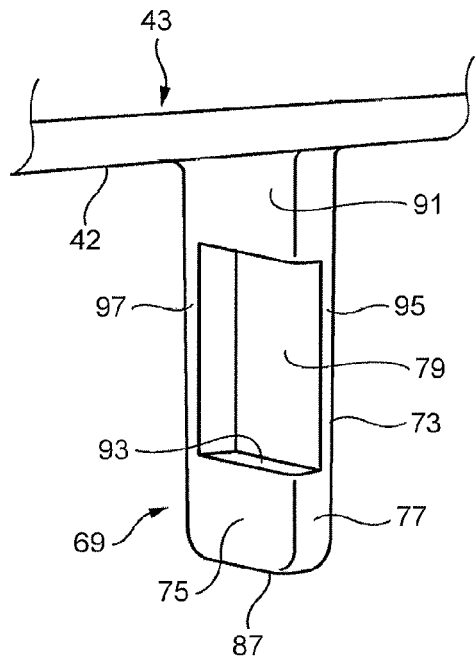
FIG. 3A is an enlarged perspective view of the relevant part of a substantially quadrangular prismatic portion illustrated in FIG. 2.

As illustrated in FIGS. 3A to 4B, the assembly structure for assembling the decorative ring 43 according to the embodiment includes a locking protrusion 69, which is disposed in a protruding manner on the speedometer ring portion 42 of the decorative ring 43, and a locking portion 71, which is formed in the meter case 41 for the purpose of locking the locking protrusion 69. As illustrated in FIG. 3A, the locking protrusion 69 includes a substantially quadrangular prismatic portion 73, which is disposed in a hanging manner from the speedometer ring portion 42 of the decorative ring 43, and a locking depression 79, which is formed by means of notching across two adjacent lateral faces (over a first lateral face 75 and a second lateral face 77) of the substantially quadrangular prismatic portion 73.

Figure 3B:
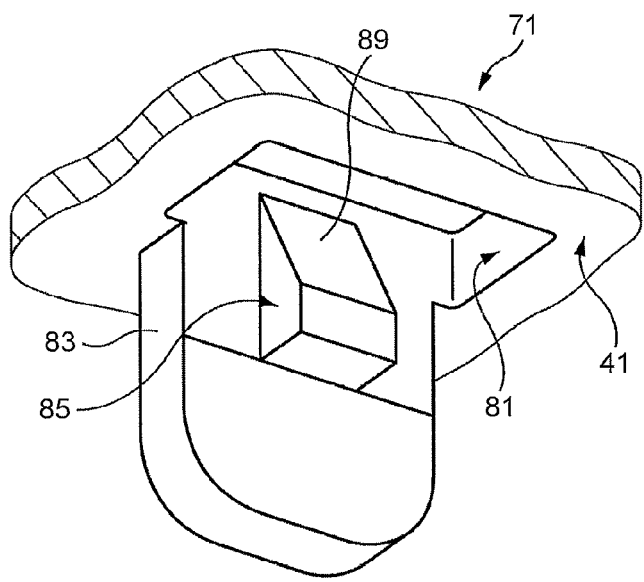
FIG. 3B is an enlarged perspective view of the relevant part when a locking portion illustrated in FIG. 2 is viewed from the inside of a locking hole.

As illustrated in FIG. 3B, the locking portion 71 includes a locking wall 83, which extends inward from the opening edge of a locking hole 81 that is formed in the meter case 41, and a locking protruding part 85, which is disposed in a protruding manner on the locking wall 83 and which engages with the locking depression 79.

The substantially quadrangular prismatic portion 73 has a round chamfering 87 at the leading end thereof. Correspondingly, the locking protruding part 85 that is disposed in a protruding manner on the locking wall 83 has a tapered surface 89 which makes a sliding contact with the leading end of the substantially quadrangular prismatic portion 73. The tapered surface 89 is formed as an inclined surface that has a gradual increase in height toward the direction of insertion of the substantially quadrangular prismatic portion 73 (i.e., toward the deep portion of the hole) from the locking wall 83.

Given below is the explanation of the action of the assembly structure for assembling the decorative ring 43 that has the configuration explained above.

In the assembly structure for assembling the decorative ring 43 according to the embodiment, as illustrated in FIG. 5, the locking protrusion 69 that is disposed in a hanging manner from the speedometer ring portion 42 of the decorative ring 43 gets locked in the locking portion 71 of the meter case 41. As a result, the decorative ring 43 gets assembled (fixed) to the meter case 41.

As far as the locking protrusion 69 is concerned, the substantially quadrangular prismatic portion 73 thereof is inserted from the opening edge of the locking hole 81 along the locking wall 83. While being inserted, the substantially quadrangular prismatic portion 73 goes in with the leading end thereof remaining abutted against the locking protruding part 85 that is disposed in a protruding manner on the locking wall 83. As a result, the substantially quadrangular prismatic portion 73 undergoes elastic deformation. Once the substantially quadrangular prismatic portion 73 is inserted to a predetermined depth of the locking hole 81, the locking depression 79 of the substantially quadrangular prismatic portion 73 falls in alignment with the locking protruding part 85. Then, the substantially quadrangular prismatic portion 73 elastically returns, and the locking depression 79 engages with the locking protruding part 85. As a result, the substantially quadrangular prismatic portion 73 is prevented from coming off from the locking hole 81, and thus the decorative ring 43 gets assembled to the meter case 41.

Herein, the locking depression 79 is formed by means of notching across two adjacent lateral faces of the substantially quadrangular prismatic portion 73. Hence, as compared to the known locking claw 65 (see FIG. 2) that includes a locking depression formed by means of notching across three adjacent lateral faces; it becomes possible to enhance the stiffness property (the second moment of area) of the substantially quadrangular prismatic portion 73 at a same outer diameter thickness D (see FIG. 6), as well as to achieve downsizing of the locking structure.

Thus, as illustrated in FIG. 3A, the locking protrusion 69 according to the embodiment has an locking inner wall surface 93 on the opposite side of a prismatic base portion 91 and across the locking depression 79 of the substantially quadrangular prismatic portion 73. The locking inner wall surface 93 is formed as one of the inner wall surfaces of the locking depression 79. The prismatic base portion 91 and the locking inner wall surface 93 are connected by a depression bottom wall 95 and a depression side wall 97 forming an L-like cross-sectional shape.

Figure 6:
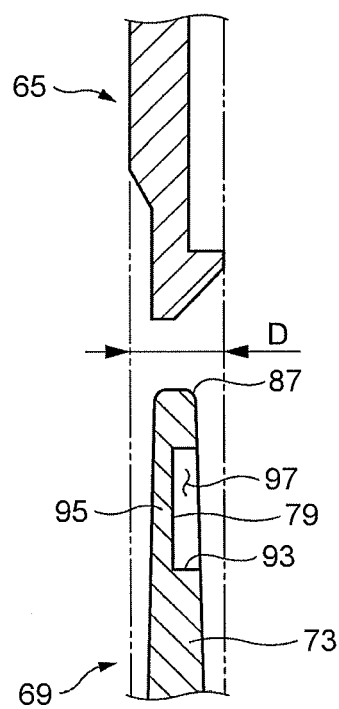
FIG. 6 is a cross-sectional view of the relevant part for comparing the thickness of the locking protrusion according to the embodiment of the locking structure with the thickness of a conventional locking structure.

As far as the known locking claw 65, which is formed by means of notching three adjacent lateral faces, is concerned; configuration includes only the depression bottom wall 95 that is same as the present configuration. Thus, in order to achieve a locking strength that is identical to the present configuration, it is necessary to increase the thickness of the portion equivalent to the depression bottom wall 95 of the present configuration. However, if the thickness of the portion equivalent to the depression bottom wall 95 is increased, then the locking margin for the locking claw 65 decreases. For that reason, in order to achieve an identical locking strength and the locking margin as the present configuration (in order to achieve the locking inner wall surface 93 of the present configuration), as illustrated in FIG. 6, the thickness of the locking claw 65 increases to the thickness D thereby leading to an increase in the size of the locking structure.

In contrast, in the locking structure according to the embodiment, because of the presence of the depression side wall 97, the locking strength can be enhanced without having to increase the thickness of the depression bottom wall 95. Hence, it becomes possible to achieve a sufficient locking margin (to achieve the locking inner wall surface 93). That enables achieving downsizing of the locking structure.

Moreover, in the assembly structure for assembling the decorative ring 43 according to the embodiment, the second lateral face 77, which is one of the two lateral faces in which the locking depression 79 is formed by means of notching, serves as a lateral face of the substantially quadrangular prismatic portion 73 that is positioned outward in the radial direction of the speedometer ring portion 42 of the decorative ring 43.

Figure 7A:
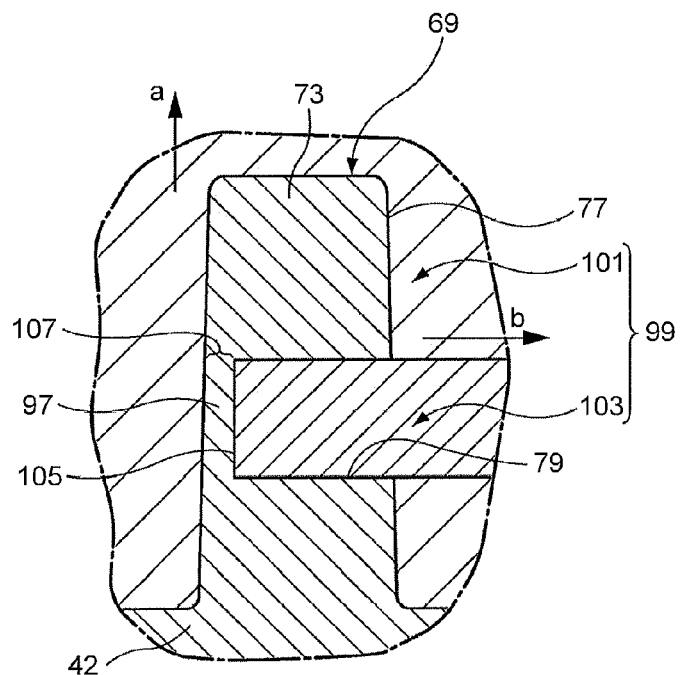
FIG. 7A is a cross-sectional view of the relevant part illustrating a die during integral molding of the locking protrusion illustrated in FIG. 3A.

As illustrated in FIG. 7A, the decorative ring 43 according to the embodiment is integrally molded by means of injection molding of a synthetic resin material in a die 99. Herein, the die 99 is made of a main mold 101 and a slide mold 103. The main mold 101 has a cavity, which is used in forming the substantially quadrangular prismatic portion 73 in the decorative ring 43, and has the mold opening direction (the direction indicated by an arrow a in FIGS. 7A and 7B) in the direction along the axis line of the substantially quadrangular prismatic portion 73. Regarding the slide mold 103, the slide direction during the mold opening is in the direction indicated by an arrow b that is perpendicular to the direction indicated by the arrow a. The locking depression 79 of the substantially quadrangular prismatic portion 73 is formed by the slide mold 103 that is slid from outside in the radial direction of the speedometer ring portion 42, which is perpendicular to the axis line of the substantially quadrangular prismatic portion 73, and that is placed at a molding position. In between the main mold 101 and a leading end 105 of the slide mold 103 is left a side-wall resin filling gap 107, which is used for the purpose of forming the depression side wall 97. Thus, the leading end 105 of the slide mold 103, which is inserted from outside of the cavity of the main mold 101 that is used in forming the substantially quadrangular prismatic portion 73, does not abut against the main mold 101.

With the use of the die 99 having the configuration explained above, a defective burr is prevented from occurring between the leading end 105 of the slide mold 103 and the main mold 101. Moreover, since it becomes possible to achieve relaxation in a stress σ of the main mold 101 and the slide mold 103, the die 99 can have a long die life.

Figure 7B:
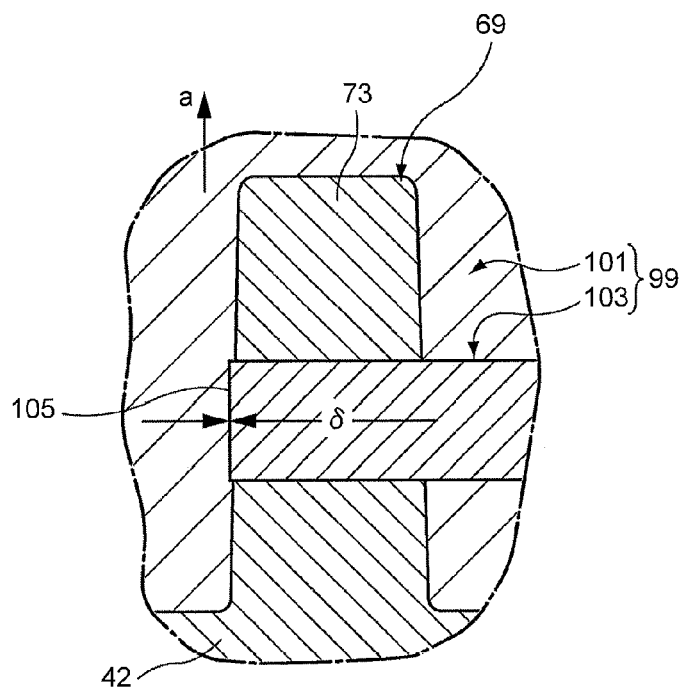
FIG. 7B is a cross-sectional view of the relevant part illustrating a die during integral molding of a locking protrusion according to a comparative example.

In contrast, as illustrated in a comparative example in FIG. 7B, when the substantially quadrangular prismatic portion 73 is formed by means of notching across three adjacent lateral faces, the side-wall resin filling gap 107 is not left and the leading end 105 of the slide mold 103 is forced to abut against the main mold 101. For that reason, there is a chance that a defective burr occurs between the leading end 105 of the slide mold 103 and the main mold 101 and that the stress σ increases at the abutting portion between the main mold 101 and the slide mold 103.

Moreover, in the assembly structure for assembling the decorative ring 43 according to the embodiment; while being inserted, the substantially quadrangular prismatic portion 73 goes in with the leading end thereof remaining abutted against the locking protruding part 85 that is disposed in a protruding manner on the locking wall 83. Hence, the substantially quadrangular prismatic portion 73 undergoes elastic deformation. Herein, the substantially quadrangular prismatic portion 73 has the round chamfering 87 at the leading end thereof; while the locking protruding part 85 has the tapered surface 89. Hence, there occurs a decrease in the insertion friction between the leading end of the substantially quadrangular prismatic portion 73 and the locking protruding part 85 of the locking wall 83, and a smooth engagement can be ensured between the locking depression 79 of the substantially quadrangular prismatic portion 73 with the locking protruding part 85 of the locking portion 71.

In this way, in the assembly structure for assembling the assembly member, it becomes possible to downsize the locking structure (the locking protrusion 69 and the locking portion 71) that is used in attaching the decorative ring 43 to the meter case 41. Hence, even in the meter case 41 having a high degree of limitations of space, the decorative ring 43 can be assembled in a reliable manner.

Meanwhile, as compared to a known claw locking structure, the assembly structure for assembling the decorative ring 43 according to the embodiment is subjected to a greater insertion stress. For that reason, in the embodiment described above, the present configuration of the assembly structure is used in only some portion of the decorative ring 43. However, if the insertion stress is at an acceptable level, then the present configuration can be used as all locking structures. Moreover, in the embodiment, although the explanation is given for a case in which the assembly structure according to the present invention is implemented for the decorative ring 43 and the meter case 41, the assembly structure for assembling an assembly member according to the present invention is not limited to be applicable to the decorative ring 43 and the meter case 41. Alternatively, it is obvious that the same function effect as described above can be achieved even when various other types of assembly members and target members to be assembled are used.

Thus, as far as the assembly structure for assembling the decorative ring 43 according to the embodiment is concerned, such an assembly structure for assembling the decorative ring 43 can be disposed which is smoothly insertable within a small space in the meter case 41. Hence, without impacting the meter design, it becomes possible to prevent the occurrence of floating and strange noise of the decorative ring 43.

Meanwhile, the present invention is not limited to the embodiment described above and it is possible to implement various modifications and improvements within the scope of the present invention. Besides, the material, the shape, the dimension, the number, and the arrangement location of each constituent element according to the embodiment described above can be set in an arbitrary manner within the scope of the present invention.

In the assembly structure for the assembly member according to one aspect of the present invention, the locking protrusion of the assembly member gets locked in the locking portion of the target member to be assembled, and the assembly member gets assembled (fixed) to the target member to be assembled.

The locking protrusion includes the locking depression that is formed by means of notching across two adjacent lateral faces of the substantially quadrangular prismatic portion. Hence, as compared to a locking claw that includes a locking depression formed by means of notching across three adjacent lateral faces; it becomes possible to enhance the stiffness property (the second moment of area) of the substantially quadrangular prismatic portion at the same outer diameter thickness, as well as to achieve downsizing of the locking structure.

In the assembly structure for the assembly member according to another aspect of the present invention, while being inserted, the substantially quadrangular prismatic portion goes in with the leading end thereof remaining abutted against the locking protruding part that is disposed in a protruding manner on the locking wall. As a result, the substantially quadrangular prismatic portion undergoes elastic deformation. Herein, the substantially quadrangular prismatic portion has the round chamfering at the leading end thereof; while the locking protruding part has a tapered surface. Hence, there occurs a decrease in the insertion friction between the leading end of the substantially quadrangular prismatic portion and the locking protruding part of the locking wall, and a smooth engagement can be ensured between the locking depression of the substantially quadrangular prismatic portion with the locking protruding part of the locking portion.

In the assembly structure for the assembly member according to still another aspect of the present invention, it becomes possible to downsize the locking structure that is used in attaching the decorative ring to the meter case. Hence, even in a meter case having a high degree of limitations of space, the decorative ring can be assembled (fixed) in a reliable manner.

In the assembly structure for the assembly member according to still another aspect of the present invention, during integral molding of the decorative ring, a slide mold used in forming the locking depression is slid from outside in the radial direction of the decorative ring. The leading end of the slide mold, which is inserted from outside of the cavity of a main mold used in forming the substantially quadrangular prismatic portion, does not abut against the main mold. As a result, a defective burr is prevented from occurring between the leading end of the slide mold and the main mold. Moreover, it becomes possible to achieve relaxation in the stress of the main mold.

According to an assembly structure for an assembly member according to the present invention, it is possible to provide a locking structure smoothly insertable within a small space and to prevent an occurrence of floating of the assembly member and an occurrence of a strange noise.

Although the present invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An assembly structure comprising:
   a locking protrusion disposed in a protruding manner on an assembly member; and
   a locking portion formed in a target member to be assembled and configured to lock the locking protrusion, wherein
   the locking protrusion includes a substantially quadrangular prismatic portion, which is disposed in a hanging manner from the assembly member, and a locking depression extending into the substantially quadrangu- lar prismatic portion from only two adjacent lateral faces of the substantially quadrangular prismatic portion, the locking portion includes a locking wall, which extends inward from an opening edge of a locking hole that is formed in the target member to be assembled, and a locking protruding part, which is disposed in a protruding manner on the locking wall and which engages with the locking depression, the assembly member is a decorative ring disposed on a front side of a dial, the target member to be assembled is a meter case, and when the decorative ring is attached to and fixed to the meter case so that the decorative ring is disposed to an outer periphery of the dial, and so that the dial is sandwiched between the decorative ring and the meter case, the locking protrusion is disposed to the decorative ring in a hanging manner toward the locking hole formed in the meter case.

2. The assembly structure according to claim 1, wherein the substantially quadrangular prismatic portion includes a round chamfering at a leading end thereof, and the locking protruding part includes a tapered surface which makes a sliding contact with the leading end of the substantially quadrangular prismatic portion.

3. The assembly structure according to claim 1, wherein one of the two adjacent lateral faces, which the locking depression extends into the substantially quadrangular prismatic portion from, serves as a lateral face of the substantially quadrangular prismatic portion that is positioned outward in the radial direction of the decorative ring.

* * * * *